June 6, 1939.  M. RINFRET  2,161,384

TIRE PRESSURE REGULATOR AND AUTOMATIC PUMPING MECHANISM

Filed Nov. 27, 1937  2 Sheets-Sheet 1

Inventor
Maurice Rinfret
By
Attorney.

June 6, 1939.  M. RINFRET  2,161,384

TIRE PRESSURE REGULATOR AND AUTOMATIC PUMPING MECHANISM

Filed Nov. 27, 1937  2 Sheets-Sheet 2

Inventor
Maurice Rinfret
By
Attorney.

UNITED STATES PATENT OFFICE 2,161,384

TIRE PRESSURE REGULATOR AND AUTOMATIC PUMPING MECHANISM

Maurice Rinfret, Sunnyside, Long Island, N. Y.

Application November 27, 1937, Serial No. 176,840

6 Claims. (Cl. 152—418)

The present invention relates to improvements in a tire pressure regulator and automatic pumping mechanism, and its principal object is to maintain in a pneumatic tire a constant pressure.

Further object is to provide a pumping mechanism adapted to be attached to the wheels of an automobile, whereby said pumping mechanism will be actuated by any shock upon said wheels caused by the uneven or rough condition of the road-bed, or any acceleration of the speed, or by applying suddenly the brakes, or by any other means which may cause an oscillating element mounted thereon to oscillate and thus actuate said pumping mechanism.

Another object is to eliminate the danger of "blow-outs" caused by excessive pressure; warn the driver when the pressure falls below normal due to a slow-leak or puncture, reduce the danger of skidding and the excessive wear and tear of the tires.

Other objects will hereinafter appear from the following description and accompanying drawings, in which.

Like numerals of reference indicate corresponding parts in each figure.

Figure 1:
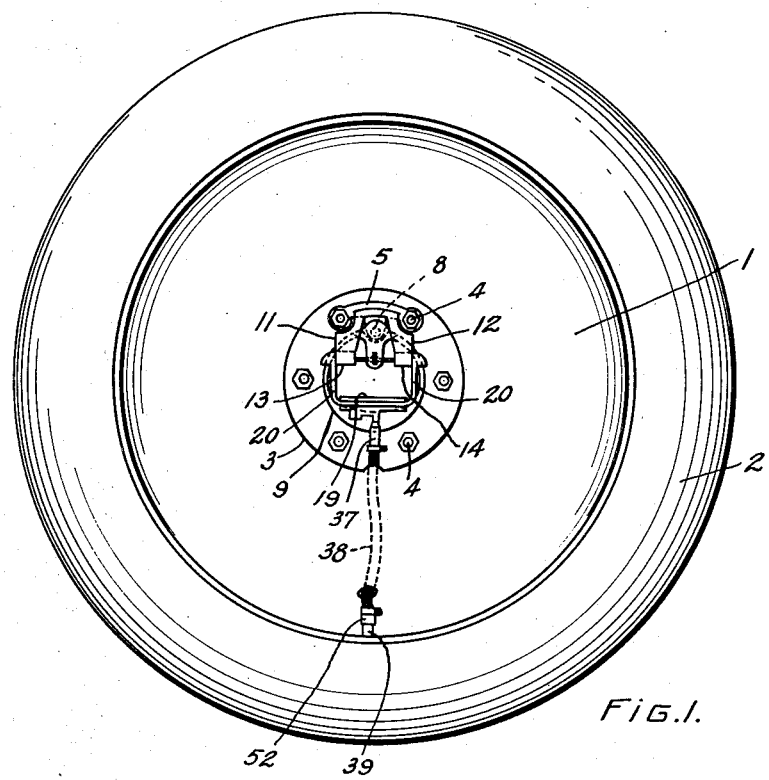
Fig. 1 is an outer elevational view of a wheel of an automobile upon which is mounted a device according to this invention.

Referring to the drawings, 1 indicates an automobile wheel upon which is mounted the usual pneumatic tire 2, said wheel usually having adjacent to its central or hub portion a recess 3 in which are provided holes adapted to receive the bolts 4 by means of which it is secured upon the usual hub plate.

In said recess is rigidly mounted the supporting frame 5 provided with preferably two bolt holes 6, in which two of said bolts 4 engage and are secured therein by suitable nuts. Centrally of said frame extends the bracket 7 upon which is pivotally mounted at 8 the oscillating frame 9 preferably of circular shape and suitably weighted at its free end 10. From said frame 5 also extends therefrom, on either side of said bracket 7, the supports 11 and 12 upon the ends of which are respectively mounted the cylinders 13 and 14 disposed in alinement and opposite one another.

In each of the heads of said cylinders 13 and 14 is provided an air intake opening 15 controlled by the ball-valve 16, and 17 is an outlet opening controlled by the ball-valve 18, each of said outlet openings being connected to the pressure-control chamber 19 by means of the pipes or conduits 20. In said cylinders 13 and 14 are movably mounted the pistons 21 and 22 is a connecting rod provided centrally with a pin 23 adapted to engage a slot 24 located in the inwardly projecting bracket 25. The frame 9, when oscillated by the shocks produced by the uneven or rough surface of the road or any other cause, will impart motion to the connecting rod 22 through the cooperating slot 24 and pin 23, thus alternatively actuating the said pistons 21.

Figure 5:
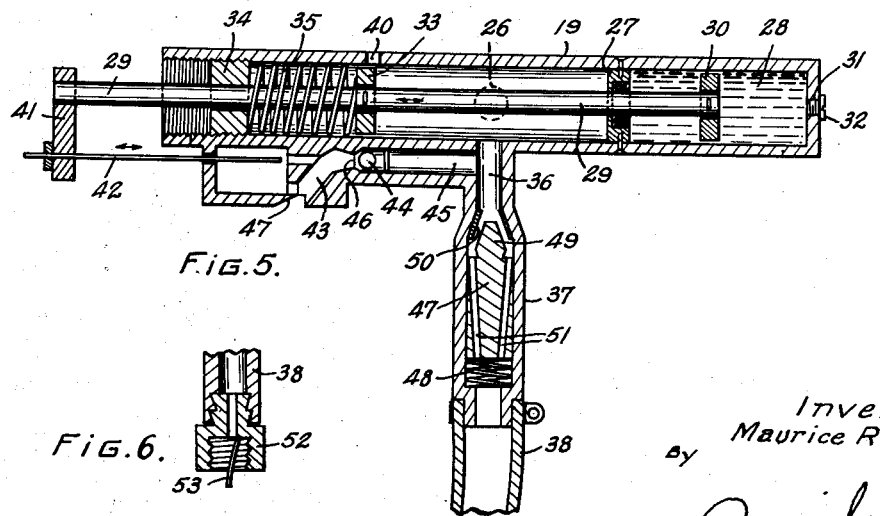
Fig. 5 is an enlarged longitudinal sectional view of the pressure control means.
Figure 6:
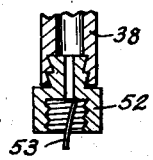
Fig. 6 is a longitudinal sectional view through the hose connecting element adapted to engage the tire-valve.
Figure 2:
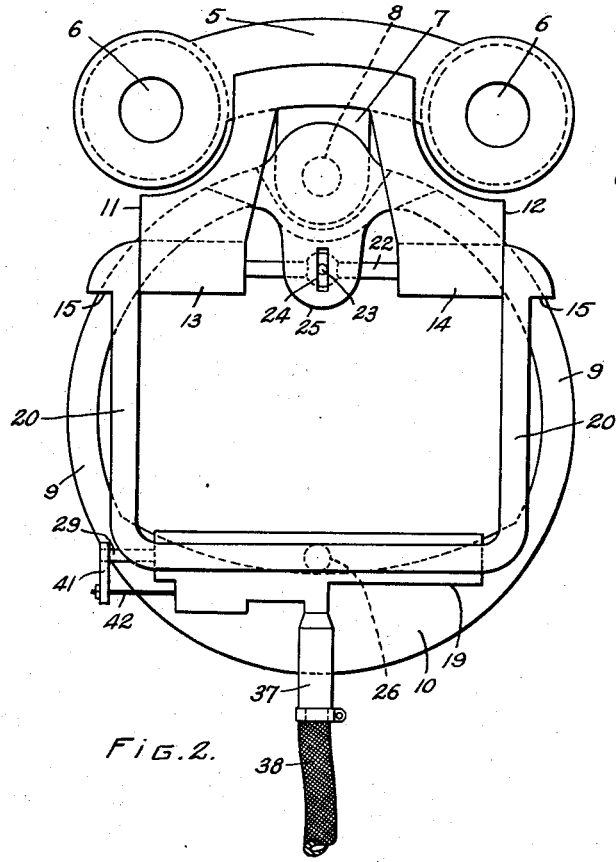
Fig. 2 is an enlarged side elevational detail view of the device.
Figure 3:
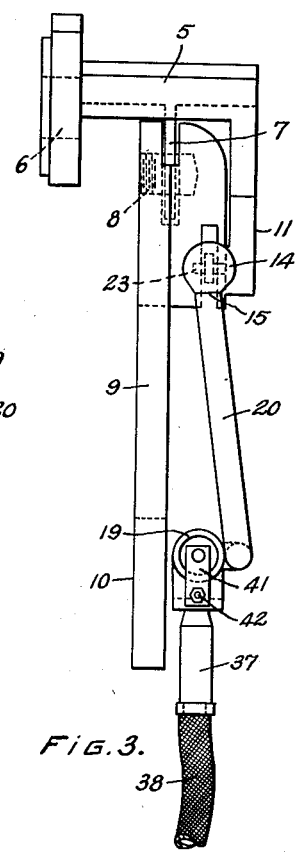
Fig. 3 is an end view of the showing of the invention in Fig. 2.
Figure 4:
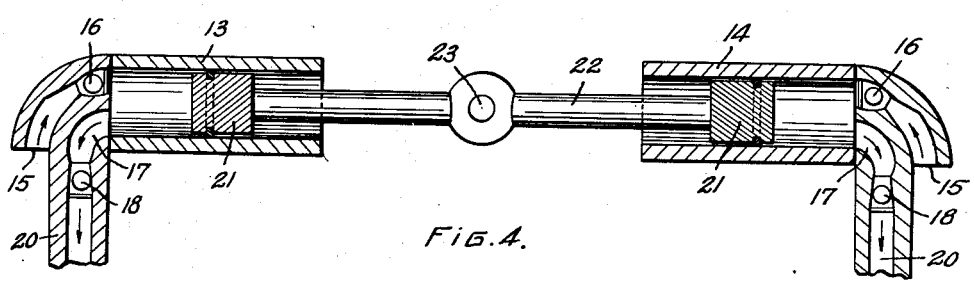
Fig. 4 is an enlarged longitudinal sectional view of the pump mechanism.

The conduits 20, as before described, connect the pressure control chamber 19 through the inlet opening 26 preferably located centrally thereof. Said pressure chamber 19 as shown in Figure 5 consists of an elongated cylinder closed at one end and open at the opposite end. Within said cylinder is disposed a wall 27 forming a closed compartment or chamber 28 and through said wall operates a rod 29 carrying a plunger 30 located within said chamber 28. Said chamber is preferably filled with oil to act as a retarder for said plunger. A suitable inlet opening 31 is provided in the closed end wall of said chamber by means of which the oil may be introduced therein and 32 is a closure for said opening. Upon said rod 29 is also fixedly mounted the piston 33, and 34 is a threaded adjustable plug engaging in the open end of said cylinder against which the coil spring 35 abuts at one end, the other end of the spring abutting against the piston 33.

After the compressed air produced in the cylinders 13 and 14 enters into the pressure chamber 19, it passes through the passageway 36, the centrifugal valve 37, through the flexible hose or pipe 38 and tire-valve 39 into the tire 2. The plug 34 in the pressure chamber 19 is adjusted to the desired pressure, but if the air pumped into the tire exceeds the "predetermined" pressure, the piston 33 will be pressed outwardly to allow the superfluous compressed air to escape through the safety-outlet-opening 40. On the other hand, if the pressure in the tire becomes very low, due to a slow-leak or puncture, the coil spring 35 will press the piston 33 inwardly, thus carrying with it the rod 29, at the end of which is provided a lug 41, from which extends the rod 42 entering into the valve chamber 43 to press the ball-valve 44 away from its seat 46, so as to allow the air to pass through the conduit 45, into the passageway 43, to actuate a whistle 47 or any other suitable means to signal the driver of the automobile that the air pressure is below normal.

When the automobile is stationary, the centrifugal valve 37 automatically closes to prevent the air in the tire from escaping back into the passageway 36 and into the pressure chamber. The centrifugal force produced by the wheels when spinning will retract the elongated shaped valve member 47 and compress the coil spring 48, disposed at the bottom of the valve chamber, thus causing the cone-shaped end 49 to release its contact with the valve seat 50, thus allowing the compressed air to pass through the longitudinal air passages 51 provided in said valve member 47. From said centrifugal valve 37, the compressed air passes through the flexible conduit 38, preferably, through a cap 52 threading over the usual air-valve 39 provided upon the tire. The cap 52 is provided inwardly with a finger 53, or any other suitable means, adapted to engage the valve pin (not shown) in said air-valves, thereby pressing it inwardly to open said valve in order to allow for a constant air communication between the tire and the present device.

It will be understood that changes may be made in the present construction and arrangement of parts without departing from the spirit and scope of the following claims of novelty.

What I claim as my invention is:

1. A device of the character described, in combination with a wheel of an automobile and a tire mounted thereon, comprising a supporting frame fixedly secured to said wheel, an air pump mounted upon said frame, means to actuate said air pump, a pressure regulator, constantly open means connecting said pressure regulator to said air pump, means connecting said pressure regulator to said tire, and a valve in said last named connecting means adapted to automatically open when said wheel is rotated and close when stationary, substantially as described.

2. A device of the character described, in combination with a wheel of an automobile and a tire mounted thereon, comprising a supporting frame secured to said wheel, an air pump mounted upon said frame, an oscillating element adapted to actuate said air-pump, a pressure regulator, constantly open means connecting said pressure regulator to said air-pump, a centrifugal valve connected to said pressure regulator, means connecting said tire to said centrifugal valve, and said pressure regulator being constructed and arranged to automatically signal when the air pressure in said tire is below a predetermined minimum.

3. A device of the character described, in combination with a wheel of an automobile and a tire mounted thereon, comprising a supporting frame fixedly secured to said wheel, an air pump mounted upon said frame, an oscillating element adapted to actuate said air pump, a pressure regulator, constantly open means connecting said pressure regulator to said air-pump, a centrifugal valve connected to said pressure regulator, and means connecting said tire to said centrifugal valve.

4. A device of the character described, in combination with a wheel of an automobile and a tire mounted thereon, comprising a supporting frame fixedly secured to said wheel, an air pump mounted upon said frame, said air pump consisting of two cylinders oppositely disposed and in alinement with one another, each of said cylinders having an air inlet and outlet opening, a piston movably mounted in each cylinder, an operating rod connecting each of said pistons, said rod being provided, intermediate thereof, with a pin, an oscillating element eccentrically and operatively mounted upon said pin, whereby, said element upon being oscillated will impart a to and fro motion to said rod and pistons, a pressure regulator, constantly open means connecting the outlet openings in the cylinders to said pressure regulator, a centrifugal valve connected to said pressure regulator, and connecting means between said centrifugal valve and said tire.

5. A device of the character described, in combination with a wheel of an automobile and a tire mounted thereon, comprising a supporting frame fixedly secured to said wheel, an air pump mounted upon said frame, means to actuate said air pump, a pressure regulator consisting of a cylindrical element having an open end and a liquid containing chamber at the other end, an air inlet and outlet opening intermediate thereof and a safety outlet, a plunger in said liquid containing chamber, a piston in said cylindrical element, an adjustable air-pressure plug adjacent to the open end of said cylindrical element, tension means between said piston and plug, a rod connecting said plunger and piston, a centrifugal valve connected to said outlet opening, constantly open means connecting said inlet opening with the air pump, means connecting said centrifugal valve to said tire, and said pressure regulator being constructed and arranged to automatically signal when the air-pressure in said tire is below the predetermined minimum.

6. A device of the character described, in combination with a wheel of an automobile and a tire mounted thereon, comprising a supporting frame fixedly secured to said wheel, an air pump mounted upon said frame, said air pump consisting of two cylinders oppositely disposed and in alinement with one another, each of said cylinders having an air inlet and outlet opening, a piston movably mounted in each cylinder, an operating rod connecting each of said pistons, said rod being provided, intermediate thereof, with a pin, an oscillating element eccentrically and operatively mounted upon said pin, whereby, said element upon being oscillated will impart a to and fro motion to said rod and pistons, and means forming communication between said pump and tire.

MAURICE RINFRET.